(No Model.)
D. A. JOHNSON.
THILL COUPLING.
No. 282,086. Patented July 31, 1883.
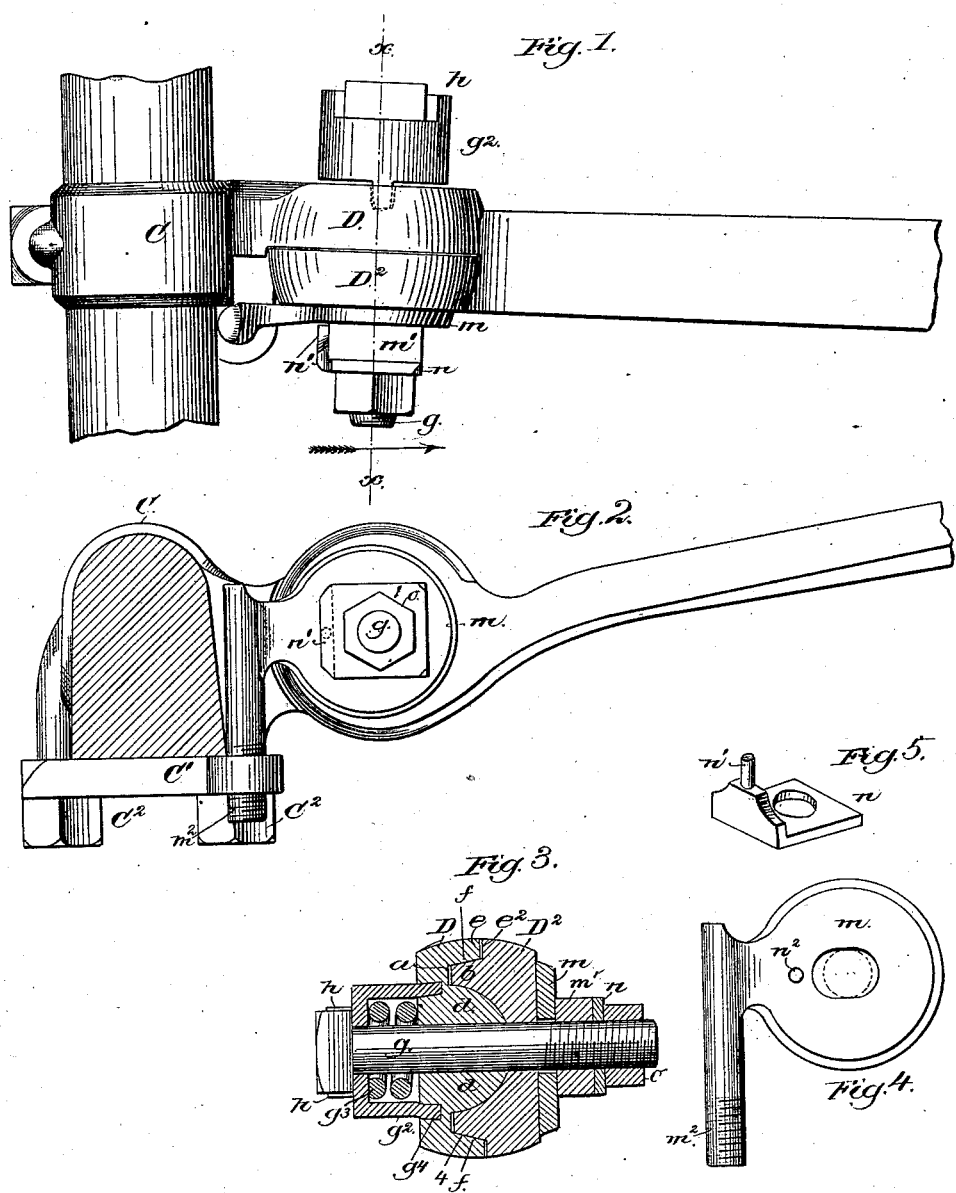
Witnesses.
John F. C. Brinkert
Fred A. Drwell
Inventor:
Daniel A. Johnson.
by Crosby Gregory
attys.

UNITED STATES PATENT OFFICE.

DANIEL A. JOHNSON, OF BOSTON, MASSACHUSETTS.

THILL-COUPLING.

SPECIFICATION forming part of Letters Patent No. 282,086, dated July 31, 1883.

Application filed May 7, 1883. (No model.)

*To all whom it may concern:*

Be it known that I, DANIEL A. JOHNSON, of Boston, county of Suffolk, State of Massachusetts, have invented an Improvement in Thill-Couplings, of which the following description, in connection with the accompanying drawings, is a specification, like letters on the drawings representing like parts.

This invention is an improvement on United States Patent No. 198,803, granted to me January 1, 1878, and has for its object to secure a greater or more extended bearing, thus making the coupling more durable and reducing its liability to rattle. I have also provided the bolt which holds the cone-shaped disks together with a locking device and spring-cap, the latter being located between the head of the bolt and the stationary disk; and I have also provided the nut of the said bolt with a locking device, and between the rear side of the said nut and the outer side of one of the said cones I have placed an ear-plate, which is supported in this instance by a part of the yoke of the axle-clip, the ear-plate serving to hold and steady the bolt, the connection of the ear-plate with the said yoke preventing the ear-plate from turning with the bolt or with the disk connected with the thill. The said ear-plate is, however, provided at its center with an opening of greater diameter than the bolt to permit the ear-plate to be turned aside for the easy application of the disk or cone of the thill to the corresponding disk or cone of the clip.

Figure 1 represents in top view a portion of an axle and one thill, with one of my thill-couplings applied. Fig. 2 is a side elevation thereof. Fig. 3 is a section on the dotted line $x\,x$, Fig. 1. Fig. 4 is a detail of the ear-plate, and Fig. 5 is a detail of the nut-lock.

The axle and thill are of usual construction.

The clip C, passed about the axle and fastened below it by the yoke C′ and nuts C², has extended forward from it a disk, D, it having its inner face grooved, as shown at $a$, Fig. 3, to receive a projecting annulus, $b$, of the disk D², attached to the thill, the said disk D also having a centrally-projecting cone, $d$, to enter a correspondingly-shaped recess made in the opposed face of the disk D².

The disk D has an annular rim, $e$, which comes opposite to, but does not abut against, a shoulder, $e^2$, on the opposed disk D². The contacting-surfaces are those of the central projection, $d$, and its opposed recess, and the outer side, 4, of the annular projection $b$, and the surface $f$ of disk D, which bears against the surface 4. These cone-shaped contacting-surfaces, very large in proportion to the diameter of the disks D D², afford extension bearing-surfaces, and they are so shaped and fitted to each other that the disk D² may follow up any wear between its face and that of the stationary disk D, and to insure this following up of the said disk to compensate for wear I have provided the bolt $g$, just inside its head, with a case, $g^2$, in which I have placed a spring, $g^3$, and I have provided the open end of the said spring-case with prongs $g^4$ to enter recesses in the stationary disk D, the said prongs and recesses preventing the said case from being rotated, and the latter so held stationary has at its outer end, at one or more sides of the head of the bolt, one or more projections, $h$, to act against the sides of the head of the bolt, as shown in Fig. 1, to prevent it from turning when the nut is being turned.

The end of the bolt, extended through the center of the movable disk attached to the thill, is passed through a central slot in the ear-plate $m$, and then receives upon it a nut, $m'$, and outside of the said nut the bolt is provided with a nut-lock, $n$, made as a washer, provided with a right-angled projection, $n'$, extended down across and close to one of the flattened edges of the nut $m'$, and having a prong to enter an opening, $n^2$, in the ear-plate $m$. (See Fig. 4.) The extreme end of the bolt is provided with a check-nut, $o$, which keeps the nut-lock in place.

The ear-plate has a vertical stem, $m^2$, preferably screw-threaded, as shown in Fig. 2, and screwed into a projection of the yoke C′. The ear-plate is adapted to be swung about its stem as a center of motion when it is desired to remove or attach the thill, thus leaving the inner sides of the stationary disks exposed for the ready placement of the disks of the thill against them.

I claim—

1. In a thill-coupling, the disk provided with a centrally-projecting conical portion, and a disk provided with a central recess to receive the said central projection, combined with a spring, an ear-plate, and a bolt to hold the said disks together in a yielding manner, substantially as described.

2. A disk having a central conical projection, $d$, and an annular recess, $a$, and a disk having a central depression to receive the projection $d$, and an annular projection, $b$, to enter the recess $a$, combined with a bolt, an ear-plate, and the spring-case and spring, and a nut, $m'$, to operate substantially as described.

3. A disk having a central conical projection, $d$, and an annular recess, $a$, and a disk having a central depression to receive the projection $d$, and an annular projection, $b$, to enter the recess $a$, combined with a bolt, ear-plate pivoted upon the yoke, the spring-case, and spring and nut $m'$, and nut-lock, to operate substantially as described.

4. The two disks having conical projections and recesses, and the bolt and the ear-plate, and nut $m'$, combined with the spring-case and a spring therein, the said spring-case having prongs to enter the stationary disk, substantially as described.

5. The two disks having conical projections and recesses, and the bolt, and the ear-plate and nut $m'$, combined with the spring-case, having projections to act against the head of the bolt, substantially as described.

6. The two disks having conical projections and recesses, and the bolt, the ear-plate and nut $m'$, combined with the spring-case and spring therein, the said case having one or more prongs to enter the stationary disk, and one or more projections to co-operate with the sides of the head of the bolt and prevent the same from turning as the nut is turned, substantially as described.

In testimony whereof I have signed my name to this specification in the presence of two subscribing witnesses.

DANIEL A. JOHNSON.

Witnesses:
G. W. GREGORY,
W. H. SIGSTON.